Sept. 9, 1958

G. E. THERIAULT 2,851,540

TRANSISTOR SIGNAL TRANSLATING CIRCUIT

Filed Oct. 1, 1956

INVENTOR.
GERALD E. THERIAULT

BY [signature]

ATTORNEY 2,851,540
Patented Sept. 9, 1958

2,851,540

TRANSISTOR SIGNAL TRANSLATING CIRCUIT

Gerald E. Theriault, Haddon Heights, N. J., assignor to Radio Corporation of America, a corporation of Delaware Application October 1, 1956, Serial No. 613,285

6 Claims. (Cl. 179—100.4)

This invention relates to transistor signal translating circuits and in particular to transistor circuits suitable for use in transducer systems employing phonograph pickup devices of the variable-capacity type.

The variable-capacity type phonograph pickup, and circuits used therewith, provide means for converting the mechanical movement of the pickup stylus to a corresponding electrical signal. Due to the fact that the mass of the pickup stylus may be relatively low, the use of this type pickup may result in improved frequency response and diminished record wear and record noise. By the present invention, the inherent advantages of variable-capacity type pickups may be increased by the advantages for which transistors are well known, such as low weight, small size, low noise, lack of heater power, durability, and a long operating life.

It is, accordingly, an object of the present invention to provide an improved transistor signal translating circuit which is adapted for use with phonograph-pickup devices of the variable-capacity type and the like.

In accordance with the invention, suitable biasing voltages are applied to the electrodes of a transistor so that it is biased for class C signal amplifying operation. The transistor is driven into class C operation by the application of a signal from a relatively high-frequency signal oscillator. Output current pulses, which flow in response to the application of the oscillator signal to the transistor, are amplitude modulated by varying the emitter impedance of the transistor in response to variations, for example, in the capacitance of a variable-capacity phonograph pickup. In this manner, variations in the mechanical movement of the pickup stylus in a record groove may be readily converted to corresponding electrical signals representative of the mechanical movement and, thus, of the sound recorded. These signals may then be amplified and reproduced or otherwise used in any desired manner. The circuit is reliable and readily adapted for commercial use at relatively low cost.

Figure 1:
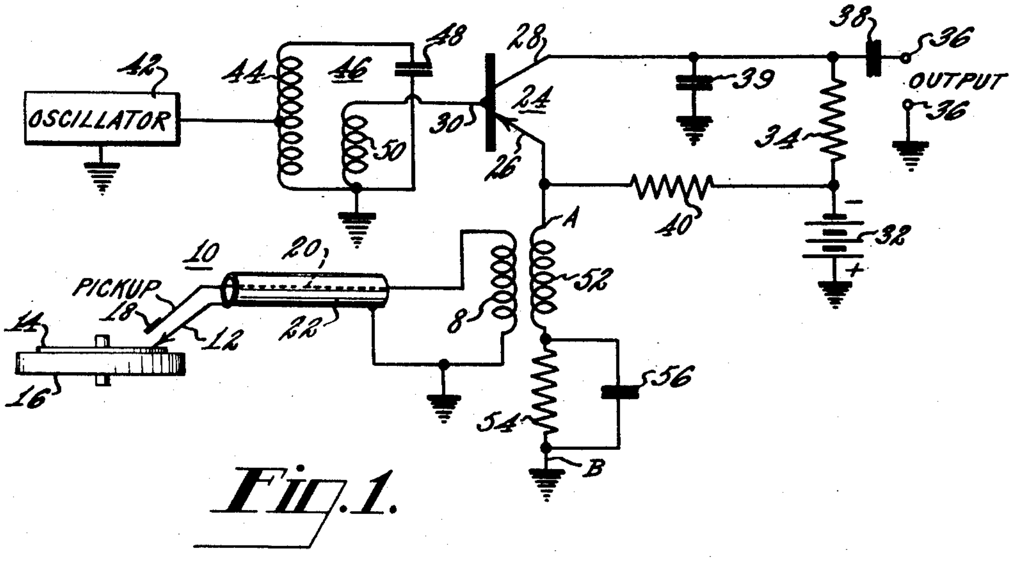
Figure 2:
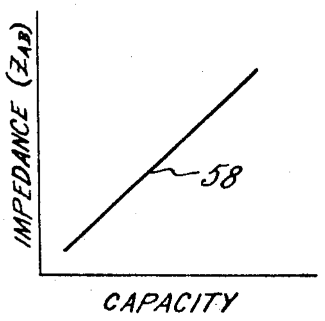

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a variable-capacity phonograph pickup circuit embodying the invention and, Figure 2 is a graph illustrating certain operating characteristics of a circuit of the type illustrated in Figure 1.

Referring to Figure 1, a tuning inductor 8 and a shunt variable capacity pickup 10 are connected to form a tunable control or parallel resonant circuit which resonates at a predetermined mean frequency. The frequency response of the parallel resonant circuit may be varied by variations of either the inductance of the inductor 8 or of the capacitance of the capacitor 10, but in the present preferred example one electrode 12 of the capacitor 10 is arranged to be the stylus of a variable-capacity phonograph pickup which is mechanically moved by the groove modulations of a phonograph record 14 on a phonograph turntable 16. The other electrode 18 of the variable-capacity pickup is relatively fixed. Accordingly, the record groove modulations will move the electrode or stylus 12 relative to the relatively fixed electrode 18 to vary the spacing therebetween and thus the capacity provided betwen these two electrodes, and thus vary the frequency response of the parallel resonant circuit.

In the present example, the inductor 8 is connected at one end through a conductor or lead 20 to the fixed electrode 18 of the variable-capacity pickup 10, and at the other end to a point of fixed reference potential such as chassis ground. The lead 20 is shielded by a conductor element 22, such as a phonograph tone arm, through which it passes. The movable electrode or stylus 12 of the variable-capacity pickup 10 is connected to the conductor element 22, which in turn is connected to the point of reference potential or ground, thus completing the parallel resonant circuit.

The circuit embodying the invention also includes a transistor signal translating amplifier 24 which has an emitter 26, a collector 28, and a base electrode 30. To provide biasing potentials for the transistor 24, a direct-current supply source, such as illustrated by a battery 32, is provided, the positive terminal of which is grounded. The negative terminal of the battery 32 is connected through an output load resistor 34, having resistance in a typical example of 3,000 ohms, to the collector 28 of the transistor 24, thereby providing reverse bias for this electrode. Signals translated through the amplifier are derived across the load resistor 34 from a pair of output terminals 36, one of which is grounded, and the other of which is connected through a coupling capacitor 38 to the collector 28. A filter or by-pass capacitor 39, which, by way of example, may have a capacitance of .01 microfarad, is connected from the collector 28 to ground.

The transistor 24 is arranged to be operative as a class C signal amplifier. To provide this type operation, the negative terminal of the battery 32 is also connected through a biasing resistor 40 to the emitter 26 of the transistor 24. By this connection, the emitter electrode 26 is biased in the reverse relatively non-conducting direction relative to the base electrode 30. While this connection is to be preferred, any suitable biasing connection may be utilized so long as the biasing voltages are selected so that the transistor 24 is non-conductive under static operating conditions. The normally reverse direct-current bias for the transistor 24 is overcome by driving the transistor 24 by a high frequency signal generator or oscillator 42 which may be of any suitable type. The oscillator 42 may operate at a predetermined fixed frequency such, for example, as 50 megacycles and is connected to a tap on an inductor 44 of a parallel resonant tuned circuit 46. The parallel resonant circuit 46, which also includes a capacitor 48, is tuned to the frequency of the oscillator 42. The oscillator signal is applied to the base 30 through an inductive winding 50 which is in inductive coupling relation with the inductor 44 and is connected at one end to the base 30 and at the other end to ground.

Modulation of the input signal is accomplished, in accordance with the invention, by varying the impedance of the emitter circuit of the transistor 24. The emitter circuit, for this purpose, includes a coupling winding or inductor 52, which is in inductive coupling relation with the inductor 8 of the pickup parallel-resonant circuit, and connected to one end of a degenerative stabilizing resistor 54. The other end of the stabilizing resistor 54 is grounded. The resistor 54 is by-passed for signal frequencies by a by-pass capacitor 56.

While the foregoing description of the circuit has been made assuming the use of P–N–P junction transistors, it should be understood that other type transistors could be used. Transistors of P type conductivity could also be used, it should be also understood, providing the polarity of the biasing battery is reversed.

As was mentioned hereinbefore, the direct-current biasing voltages on the electrodes of the transistor 24 are selected so that under static operating conditions the transistor 24 is non-conductive. Accordingly, the transistor 24 will conduct only when a sufficiently negative voltage is impressed between its base 30 and ground. The oscillator circuit 42 supplies this negative voltage during a portion of its alternating current cycle. Accordingly, the transistor 24 will conduct for less than a half cycle of the applied oscillator signal and class C current pulses will be developed in the collector 28. The magnitude of these pulses is a function of the voltage which is developed between the base 30 and the emitter 26 of the transistor 24. In operation, variations of the capacitance of the variable capacity pickup 10, caused by movement of the stylus electrode 12, will vary the impedance in the emitter circuit of the transistor 24. As shown by the curve 58 in Figure 2, an increase in the capacitance of the capacity pickup 10 will cause a corresponding increase in the impedance between the emitter end of the inductor 52 and ground (points A, and B, respectively). These impedance versus capacity variations are substantially linear. Since the output current pulse amplitude is dependent upon the voltage between the base 30 and the emitter 26 of the transistor 24, variation of the emitter impedance will cause variation in the amplitude of the output current pulses. Thus, the output current pulses in the collector 28 will be amplitude modulated as the capacitance of the capacity pickup 10 is varied. By filtering the oscillator signal by means of the capacitor 39 in the output circuit, the signal developed across the load resistor 34 will be an audio frequency signal representative of the mechanical movement of the stylus 12 caused by the record groove modulations, in the present example.

As described herein, a transistor signal translating circuit embodying the invention is ideally suited for use with a variable-capacity-type phonograph system. The pickup circuit provided by the invention is simple in construction, requires a minimum number of circuit elements, and is efficient and stable in operation.

What is claimed is:

1. In an electro-mechanical signal transducer system, the combination comprising, a transistor having a base circuit, an emitter circuit, and collector electrode circuit, a tunable control circuit, means providing signal coupling between said control circuit and the emitter circuit of said transistor, modulating means for varying the resonant frequency of said control circuit to vary the impedance of said emitter circuit, means providing a direct-current supply source connected with said transistor for applying biasing voltages thereto of a magnitude and polarity whereby said transistor is normally nonconductive under static operating conditions, means coupled with said base circuit for applying signal energy thereto of a magnitude and polarity to provide signal amplifying operation of said transistor and an output current in said collector circuit which is modulated in response to variations of the resonant frequency of said control circuit and the impedance of said emitter circuit, and signal output circuit means connected with said collector circuit for deriving said output current.

2. In a phonograph-record reproducing system, the combination comprising, a transistor device having a base circuit, an emitter circuit, and collector electrode circuit, a variable-capacity pickup device having a pair of spaced electrodes one of which is movable as a stylus element with respect to the other for response to record groove modulations, an inductor having terminals connected with the electrodes of said pickup device to provide therewith a tunable parallel-resonant circuit, means providing coupling between said parallel-resonant circuit and the emitter circuit of said transistor whereby variation of the frequency of said resonant circuit in response to capacity variations of said pickup device varies the impedance of said emitter circuit, direct-current supply means connected with said transistor to provide biasing voltages therefor of a magnitude and polarity whereby said transistor is normally nonconductive under static operating conditions, signal generator means coupled with said base circuit for applying an alternating-current signal thereto of a magnitude and polarity to provide signal amplifying operation of said transistor for less than a half-cycle of said applied signal and an audio frequency output current in said collector circuit which is modulated in response to variation of the resonant frequency of said parallel resonant circuit and the impedance of the emitter circuit of said transistor, and signal output circuit means connected with said collector circuit for deriving said modulated audio frequency output current.

3. In a phonograph-record reproducing system, the combination, comprising, a transistor having base, emitter, and collector electrode circuits, a variable-capacity pickup device having a pair of spaced electrodes one of which is movable as a stylus element with respect to the other in response to record groove modulation, an inductor having terminals connected with the electrodes of said pickup device to provide therewith a tunable parallel resonant circuit, a second inductor connected in the emitter circuit in inductive coupling relation with the inductor of said parallel resonant circuit whereby variation of the resonant frequency of said parallel resonant circuit in response to capacity variation of said pickup device varies the impedance of said emitter circuit, direct-current supply means connected in the collector and emitter electrode circuits of said transistor and providing biasing voltages therefor of a magnitude and polarity to render said transistor nonconductive under static operating conditions, signal generator means coupled with the base circuit for applying signal energy thereto of a magnitude and polarity to provide class C signal amplifying operation of said transistor and a signal output current in said collector circuit which is modulated in response to variations of the resonant frequency of said parallel resonant circuit and the impedance of the emitter circuit, and signal output circuit means connected with the collector circuit for deriving said output current.

4. In a phonograph-record reproducing system, the combination comprising, a transistor having base, emitter, and collector electrode circuits, a tunable parallel-resonant control circuit including a variable-capacity pickup device, means providing coupling between said control circuit and the emitter circuit of said transistor for varying the impedance of said emitter circuit in response to record modulation of said pickup device, biasing means connected in circuit for rendering said transistor substantially non-conductive under static operating conditions, means coupled with said base circuit for applying oscillations thereto of a magnitude and polarity to provide class C signal amplifying operation of said transistor and output current pulses in said collector circuit which are modulated in response to variations of the impedance of said emitter circuit, and signal output circuit means connected with said collector circuit for deriving said modulated output pulses.

5. In a phonograph-record reproducing system including a variable-capacity pickup device, the combination comprising, a transistor having base, emitter, and collector electrode circuits, a parallel resonant control circuit coupled with the emitter circuit of said transistor and variably tunable by means of said pickup device to vary the impedance of said emitter circuit, bias means for rendering said transistor non-conductive under static operating conditions, means coupled with said base circuit for applying signal energy thereto of a magnitude and polarity to provide signal amplifying operation of said transistor and an output current in said collector circuit which is modulated in response to the impedance variations of said emitter circuit, and signal output circuit means connected with said collector circuit for deriving said output current.

6. A phonograph-record reproducing system comprising, in combination, a transistor including base, emitter, and collector electrodes, a first inductor having a pair of terminals one of which is connected to a point of ground potential, a variable capacity pickup device having a pair of spaced electrodes one of which is movable as a stylus element with respect to the other in response to record groove modulations, means connecting said pickup device with said inductor, said pickup device and said inductor comprising a parallel resonant circuit which is variably tuned in response to capacity variations of said pickup device, means providing a direct-current supply source having a pair of terminals one of which is connected to said point of ground potential and the other of which is connected with the collector and emitter electrodes of said transistor for biasing said collector and emitter electrodes in the reverse relatively non-conducting direction with respect to said base electrode whereby said transistor is normally non-conductive under static operating conditions, means for varying the emitter impedance of said transistor in response to capacity variations of said pickup device including a second inductor connecting said emitter electrode to said point of ground potential and in inductive coupling relation with said first inductor, means for applying signal energy to said base electrode of polarity and sufficient amplitude to provide class C signal amplifying operation of said transistor and an output current in said collector electrode which is amplitude modulated in response to said variations in the emitter impedance of said transistor including a signal oscillator circuit coupled with said base electrode and signal output circuit means connected with said collector for deriving therefrom said output current.

No references cited.